July 7, 1953  S. M. MERCIER  2,644,575
MULTIRUBBER TIRED ADJUSTABLY SPACED
CONVEYER RETURN IDLER ASSEMBLY
Filed April 8, 1947
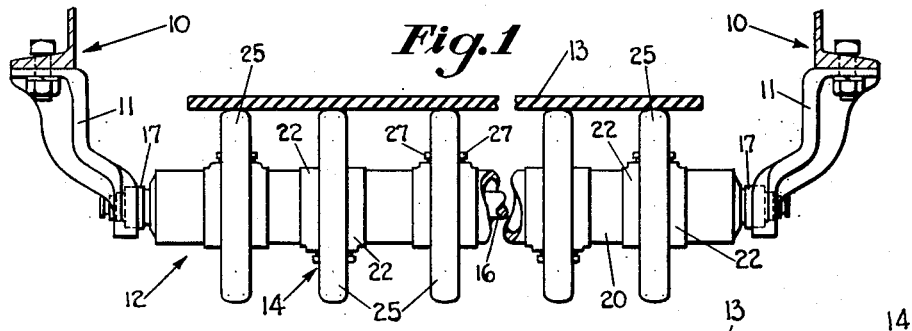
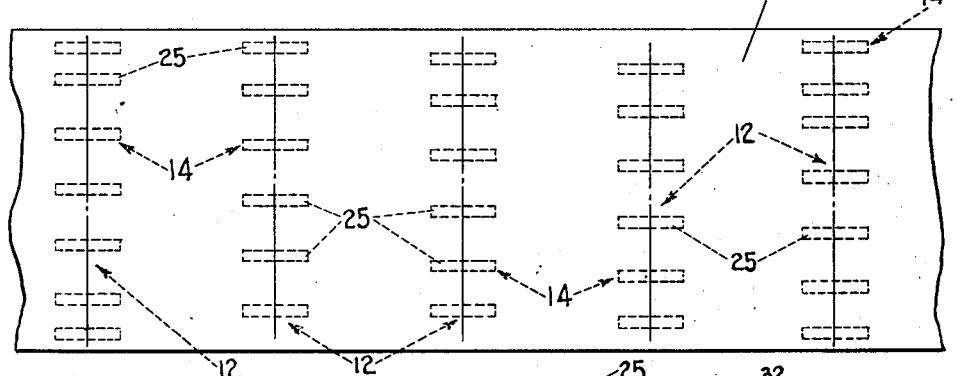
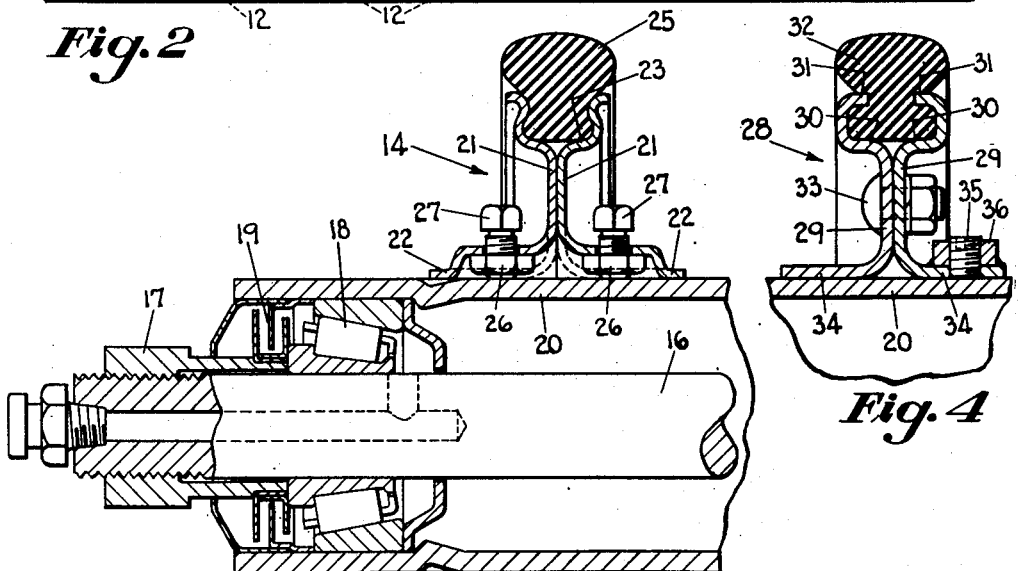
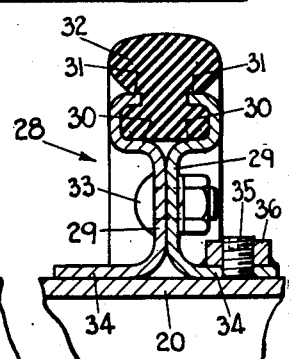
INVENTOR:
STANLEY M. MERCIER,
BY
ATTY.

Patented July 7, 1953

2,644,575

UNITED STATES PATENT OFFICE 2,644,575

MULTIRUBBER TIRED ADJUSTABLY SPACED CONVEYER RETURN IDLER ASSEMBLY

Stanley M. Mercier, Bexley, Ohio, assignor to The Jeffrey Manufacturing Company, a corporation of Ohio Application April 8, 1947, Serial No. 740,011

7 Claims. (Cl. 198—230)

This invention relates to an assembly of return idlers for the return run of a belt conveyer and to the construction of an individual idler and to an individual wheel thereof.

An object of the invention is to provide a conveyer having return idlers mounted in an improved manner.

Other objects of the invention will appear hereinafter, the novel features and combinations being set forth in the appended claims.

In the accompanying drawings,

Fig. 1 is a transverse sectional view through a conveyer, showing the bottom portion only and showing one of the return idlers;

Fig. 2 is a diagrammatic plan view of a section of the return run of the belt of a conveyer, illustrating a plurality of return idlers and particularly the positions of the wheels thereof;

Fig. 3 is a sectional elevation view through one end of an idler, showing particularly the construction of one form of wheel; and Fig. 4 is a sectional view, showing a portion of a modified form of wheel and its mounting on the idler shell.

Referring particularly to Fig. 1 of the drawings, there is illustrated a frame 10 of a belt conveyer, only the bottom portion of the side members thereof being shown. Extending downwardly from the spaced frame members 10 is a pair of spaced hanger brackets 11 which support opposite ends of return idler 12 which supports a portion of the return run of a conveyer belt 13.

As illustrated particularly in Fig. 2 of the drawings, the return run 13 of said belt is preferably supported by a plurality of longitudinally spaced idlers 12. As also illustrated in said Fig. 2, individual supporting wheels 14 of the several idlers 12 are so positioned laterally of the belt 13 or along their own axis that the contacting tires 25 will travel over substantially the entire lower surface of the belt 13 between the two outermost tires of the idlers 12, which has a desirable cleaning effect upon said belt. This relation is effected by having the spaced tires of successive idlers offset laterally with respect to each other, the offsetting being such that the area of the belt surface 13, missed by adjacent tires on any particular idler, will be contacted and supported by a tire or tires of a following or preceding idler.

The idler construction is such that individual wheels may be readily adjusted along their axes or laterally of the belt so as to produce the desired pattern above described, or any variation thereof, or to produce particular support at any lateral position of the belt along a single idler.

Attention is now directed particularly to Figs. 1 and 3 and to the construction of the idler 12 and each associated wheel 14. Each idler 12 includes a shaft 16 which extends longitudinally of the idler and transversely of the belt or conveyer, the ends of said shaft being provided with bearing adjusting nuts 17 which are supported in sockets formed in the bottoms of the hangers 11. At opposite ends, shaft 16 is provided with anti-friction roller bearings 18 and grease seals 19.

Mounted on the outer race of bearings 18 and having a relatively tight fit therewith is a tubular hub or shell 20 for the complete idler assembly. Spaced along the axis of the shaft 16 or hub 20, or, in other words, transversely of the conveyers, at axially adjustable positions, is a plurality of individual wheels 14 which are of similar construction. As illustrated in Fig. 3, each of said wheels 14 comprises a pair of similar metal plates 21 which are stamped or formed to provide a wide hub portion 22 and a peripheral rim portion 23, the hub and rim being interconnected by the intermediate circumferential wheel web portion.

The two similar metal plates 21 are clamped or attached together to form what is in effect a composite disc wheel by means of a plurality of attaching devices illustrated as rivets, one of which is seen at 24 in Fig. 3 of the drawings. If desired, nuts and bolts may be employed in place of rivets 24.

The rim portion 23 receives a tire 25, preferably continuous in construction and made of rubber or the like, the bead of said tire 25 preferably being clamped between the spaced side members of the rim portion 23. Said rim portion 23 preferably has converging outer parts which hold each individual radial section of the tire 25 against radial outward movement.

At one position the hub portion 22 of the wheel 14 is enlarged to receive a pair of nuts 26 which are loosely received in pockets formed by the hub metal or are tack-welded thereto. Nuts 26 receive set screws 27 which may be effective to clamp the hub 22 of the wheel onto the hub 20 of the entire idler assembly.

By releasing or loosening the set screws 27 it is possible to slide the individual wheel axially along said tube 20, and, in fact, each wheel may be successively removed from said tube 20 by being slid over one end thereof. Of particular significance is the fact that this clamping means provides for the ready adjustment of the wheels transversely of the conveyer or axially of the idler to any desired position so that the pattern of the wheels in the several idlers may follow that of Fig. 2 of the drawings, or any other desired pattern.

In Fig. 4 of the drawings, a modified form of wheel, designated generally by the reference character 28, is illustrated. In this form the wheel is built up of two similar metal plate stampings 29, and rim 30 has its free ends bent inwardly at 31 to extend into opposite peripheral notches formed in the rubber tire 32. Also in this form the two stampings or plates 29 are removably attached together by a plurality of nuts and bolts, one of which is seen at 33. The hub 34 of the wheel 28 is also clamped to the tube 20 by one or more set screws 35 threaded through a nut 36 which is preferably welded to the outer or exposed side of the hub 34. It is to be understood, of course, that the wheel 28 may be substituted for the wheel 14 and be adjusted in exactly the same manner as above described to provide the pattern of wheel supports for the belt 13.

The features above described relating to the structure of the idler rolls per se are claimed in my divisional application, Serial No. 348,986, filed April 15, 1953, for Conveyer Idler Roll Construction.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A conveyer including a belt, a plurality of return idlers mounted to support said belt during its return run, and individual wheels on each idler having individual rubber tires contacting and supporting said belt during its return run, the tires on each idler being spaced apart at least the width of two tires, the tires of said idlers being offset so that substantially the entire lower lateral surface of said belt between the outermost tires contacts a tire in passing over said plurality of idlers during its return run.

2. A conveyer including a belt, a plurality of return idlers mounted to support said belt during its return run, and individual wheels on each idler having individual tires contacting and supporting said belt during its return run, the tires on each idler being spaced apart at least the width of two tires, the tires of said idlers being offset so that substantially the entire lower lateral surface of said belt between the outermost tires contacts a tire in passing over said plurality of idlers during its return run.

3. A conveyer including a belt, a plurality of return idlers mounted to support said belt during its return run, and individual wheels on each idler having individual rubber tires contacting and supporting said belt during its return run, the tires on each idler being spaced apart at least the width of one tire, the tires of said idlers being offset so that substantially the entire lower lateral surface of said belt between the outermost tires contacts a tire in passing over said plurality of idlers during its return run.

4. A conveyer including a belt, a plurality of return idlers mounted to support said belt during its return run, and individual wheels on each idler having individual tires contacting and supporting said belt during its return run, the tires on each idler being spaced apart at least the width of one tire, the tires of said idlers being offset so that substantially the entire lower lateral surface of said belt between the outermost tires contacts a tire in passing over said plurality of idlers during its return run.

5. A conveyer including a belt, a plurality of return idlers mounted to support said belt during its return run, and individual wheels on each idler having individual tires contacting and supporting said belt during its return run, the tires on each idler being spaced apart at least the width of three tires, the tires of said idlers being offset so that substantially the entire lower lateral surface of said belt between the outermost tires contacts a tire in passing over said plurality of idlers during its return run.

6. A conveyer including a belt, a plurality of return idlers mounted to support said belt during its return run, individual wheels on each idler having individual tires contacting and supporting said belt during its return run, the tires on each idler being spaced apart at least the width of two tires, the tires of said idlers being offset so that substantially the entire lower lateral surface of said belt between the outermost tires contacts a tire in passing over said plurality of idlers during its return run, at least one of said idlers including a hub with a plurality of individual spaced wheels thereon, and means for adjustably clamping at least some of said wheels at different positions along said hub, said last named means including set screw means clamping with said hub.

7. A conveyer including a belt, a plurality of return idlers mounted to support said belt during its return run, individual wheels on each idler having individual tires contacting and supporting said belt during its return run, the tires on each idler being spaced apart at least the width of two tires, the tires of said idlers being offset so that substantially the entire lower lateral surface of said belt between the outermost tires contacts a tire in passing over said plurality of idlers during its return run, at least one of said idlers including a hub with a plurality of individual spaced wheels thereon, and means for adjustably clamping at least some of said wheels at different positions along said hub.

STANLEY M. MERCIER.

References Cited in the file of this patent
UNITED STATES PATENTS

| Number | Name | Date |
|---|---|---|
| 1,626,933 | Hawkins | May 3, 1927 |
| 1,628,220 | Berg | May 10, 1927 |
| 1,692,970 | Warnick | Nov. 27, 1928 |
| 1,975,591 | Sinden | Oct. 2, 1934 |
| 2,052,900 | Searles et al. | Sept. 1, 1936 |
| 2,271,166 | Weiss | Jan. 27, 1942 |
| 2,391,178 | McKnight | Dec. 18, 1945 |